(12) United States Patent
Küsel

(10) Patent No.: US 6,831,566 B1
(45) Date of Patent: Dec. 14, 2004

(54) DEVICE FOR MONITORING A CONVEYOR

(75) Inventor: Bernd Küsel, Hamburg (DE)

(73) Assignee: Phoenix AG, Hamburg (DE)

( * ) Notice: Subject to any disclaimer, the term of this patent is extended or adjusted under 35 U.S.C. 154(b) by 209 days.

(21) Appl. No.: 10/110,809

(22) PCT Filed: Sep. 30, 2000

(86) PCT No.: PCT/DE00/03455

§ 371 (c)(1),
(2), (4) Date: Apr. 16, 2002

(87) PCT Pub. No.: WO01/30673

PCT Pub. Date: May 3, 2001

(30) Foreign Application Priority Data

Oct. 22, 1999 (DE) .......................................... 199 51 199

(51) Int. Cl.⁷ .......................... G08B 21/00; B65G 25/00; B65G 29/00; B65G 43/00; B65G 47/00
(52) U.S. Cl. ..................... 340/676; 340/673; 198/464.4; 198/502.1; 198/502.4; 198/810.02
(58) Field of Search ................................ 340/673, 676; 198/810.02, 464.4, 502.1, 502.4

(56) References Cited

U.S. PATENT DOCUMENTS

| | | | |
|---|---|---|---|
| 3,651,506 A | | 3/1972 | Olaf et al. ................... 340/259 |
| 3,922,661 A | * | 11/1975 | Enabnit et al. ......... 198/810.02 |
| 4,087,800 A | * | 5/1978 | Lee ............................. 340/676 |
| 4,437,563 A | * | 3/1984 | Oriol ...................... 198/810.02 |
| 6,032,787 A | * | 3/2000 | Kellis ..................... 198/810.02 |

FOREIGN PATENT DOCUMENTS

| | | |
|---|---|---|
| DE | 24 13 543 | 10/1975 |
| DE | 31 06 568 | 9/1982 |
| DE | 42 40 094 | 6/1994 |
| DE | 44 44 264 | 12/1994 |
| DE | 199 02 759 | 8/1999 |

\* cited by examiner

*Primary Examiner*—Jeffery Hofsass
*Assistant Examiner*—Lam Pham
(74) *Attorney, Agent, or Firm*—Collard & Roe, P.C.

(57) ABSTRACT

The invention relates to a device for monitoring a conveyor. The conveyor comprises a conveyor belt in an elastomeric material, with a carrying side for the transported material, a backing side and embedded reinforcements, as well as other components: namely, drive pulleys, return pulleys, reverse pulleys, conveyor pulleys, mounting structures feed chutes and other components, where necessary. According to the invention the device is characterized by comprising an opto-electronic system in the area where no material is transported, which optically records and signals any damage done to the conveyor belt, optionally with an automatic switching off of the conveyor. The device further comprises, particularly in connection with long conveyors, at least one detectable element integrated in the conveyor belt, in particular in the form of several elements which are arranged longitudinally and/or transversely, at set distances from each other and at least one scanning device for localizing the damage by remote detection of the element or elements.

14 Claims, 3 Drawing Sheets

DEVICE FOR MONITORING A CONVEYOR

CROSS REFERENCE TO RELATED APPLICATIONS

Applicant claims priority under 35 U.S.C. §119 of German Application No. 199 51 199.3 filed Oct. 22, 1999. Applicant also claims priority under 35 U.S.C. §126 365 of PCT/DE00/03455 filed Sep. 30, 2000. The international application under PCT article 21(2) was not published in English.

BACKGROUND OF THE INVENTION (1) Field of the Invention

The invention relates to a device for monitoring a conveyor installation comprising a conveyor belt made of elastomeric material with a carrying side for the conveyed material and a backing side, whereby the conveyor belt comprises an embedded reinforcement in most cases; as well as other components such as drive pulleys, return pulleys, reverse pulleys, conveyor pulleys, mounting structures, feed chutes, as well as other components as required.

The following two complexes of problems are connected with a device of the type specified above:

(A)

Conveyor belts are highly stressed as they are being impacted by the bulk material to be conveyed. Since it is not possible to assure that the transported pieces of material have a uniform especially in the field of mining, damage to the carrying side of the conveyor belt caused by particularly large pieces of material or pieces with sharp edges occurs frequently. Damage to the carrying side is critical because conveyed material as well as water may penetrate the damaged sites of the belt, which is connected with consequential damage including damage to the reinforcement (carcass) and the backing side. Such damaged spots will grow, which will finally lead to failure of the conveyor belt unless the damage is repaired in due time.

Furthermore, large transported pieces, for example of ore, debris and rock pose the risk that they will get jammed in the feed chutes. The friction connected with such jamming will then frequently lead to early, premature wear of the carrying side of the conveyor belt. Furthermore, this may cause fire due to friction heat and sparking, which poses a particularly serious hazard in underground mining operations.

(2) Description of Related Art

Now, a device for monitoring a flow of material of a conveyor installation is described in DE-A-42 40 094, whereby the conveyor system is controlled in such a way that any oblique running of the conveyor belt and the wear are minimized, with the conveyor operating at maximum capacity. The control system is comprised of a light source that projects a band of light onto the stream of material, whereby an additional camera detects the course which the top edge of the transported material is running, as well as the corresponding run of the conveyor belt. An image evaluation unit then analyzes the course followed by the top edge.

Said system is conceived in such a way that it requires great expenditure, and is, furthermore, extremely susceptible to trouble. Furthermore, when heterogeneous material comprising small, medium-sized and very large pieces of material is transported, the course taken by the top edge can be determined only inadequately. The analysis by means of the image evaluation unit is consequently afflicted with error sources.

Furthermore, the problem complex (B) cannot be detected with said system.

(B)

Foreign bodies of material may lead to penetration of the conveyor belt in isolated cases. Such foreign bodies may be components of the feed chutes, support rollers and other components of the conveyor system. Furthermore, tools, tapping residues in foundries and sharp-edged materials contained in the transported material are hazard sources as well.

If a foreign body impacts the conveyor belt in an unfavorable way, this may cause such a foreign body to get jammed in some part of the conveyor system. The conveyor belt is pierced and continues to run with almost no obstruction because the force driving the conveyor belt is substantially higher than the resistance of the conveyor belt versus the jammed foreign body. Such a situation results in a longitudinal slitting of the conveyor belt. A repair of the conveyor belt is then no longer possible in most cases, or would be uneconomical. The damage so caused is substantial.

Methods employed for avoiding such slitting damage predominantly comprise active systems such as transverse reinforcements integrated on the carrying side of the conveyor belt, or passive systems (e.g. conductor loops, DE-C-44 44 264), which are integrated in the conveyor belt by vulcanization at defined intervals, for example of 50 m. If a conductor loop suffers damage, an electro-inductive current circuit is broken, which leads to shutdown of the conveyor system via detectors.

Transverse reinforcements may considerably increase the resistance to slitting. However, the kind of damage described above may occur nonetheless.

Conductor loops are comprised of fine metal cords that react sensitively to external influences such a continuous impacts, as well as changes occurring in the longitudinal and transverse bending. Erroneous reports issue frequently. Their useful life is highly limited.

Furthermore, said method is not suited for detecting the problem complex (A) because a material blockade caused by an oversized piece of material must not necessarily lead to penetration.

SUMMARY OF THE INVENTION

Now, the object of the invention is to provide for the entire problem complex (A+B) a device for monitoring a conveyor system that detects a damage of the conveyor belt early; which is free of wear and low in maintenance, and which is economical and requires as little technical expenditure as possible.

This object is achieved in that the device is provided with an optoelectronic system located in an area where no material is transported. Said device monitors the carrying side of the belt and optically detects and reports any damage to the conveyor belt, if necessary in conjunction with an automatic shutdown of the conveyor installation.

The optoelectronic system is preferably installed in the vicinity of the drive pulley, the return pulley or the reverse pulley. In said areas, the usually sagging conveyor belt is free of transported material and, furthermore, aligned plane. Deepened spots or other changes of the carrying side are recognizable there particularly well.

In particularly in conjunction with conveyor systems operating over large distances, which may amount to several kilometers, the device usefully comprises the following additional components:

At least one detectable element that is integrated in the conveyor belt, in particular in the form of a plurality of elements that are arranged in the longitudinal and transverse directions with a spacing from each other; as well as at least one scanning unit with the help of which the damage is localized without contact by detecting the element or elements.

Since the transported material is passing by the drive pulley, return pulley or reverse pulley only for a short time, the damage detected there by the optoelectronic system can be localized in this way within the sections farther downstream, in conjunction with repair measures implemented after the conveyor system has been shut down.

The detectable element is preferably completely embedded in the conveyor belt by vulcanization, specifically within the carrying side of the latter. The detectable element is in this connection in particular a transponder, a metal particle or a permanent magnet.

All physical principles by which the elements installed in the conveyor belt can be detected in terms of measuring technology are suited for the detection (identification) by means of the scanning unit, whereby the following has to be noted with respect to the elements specified above:

Transponders can be detected by means of special antennas with a suitable directional characteristic.

Metal particles can be detected by means of inductive methods such as, for example the eddy current method, radar waves or microwaves with ionizing radiation, or ultrasound.

Permanent magnets can be detected by means of all magnetosensitive methods such as, for example magnetoinductive methods, magnetoresistive sensors, or Hall-effect sensors.

BRIEF DESCRIPTION OF THE DRAWINGS

Now, the invention is explained in the following with the help of exemplified embodiments and by reference to schematic drawings, in which.

Figure 1:
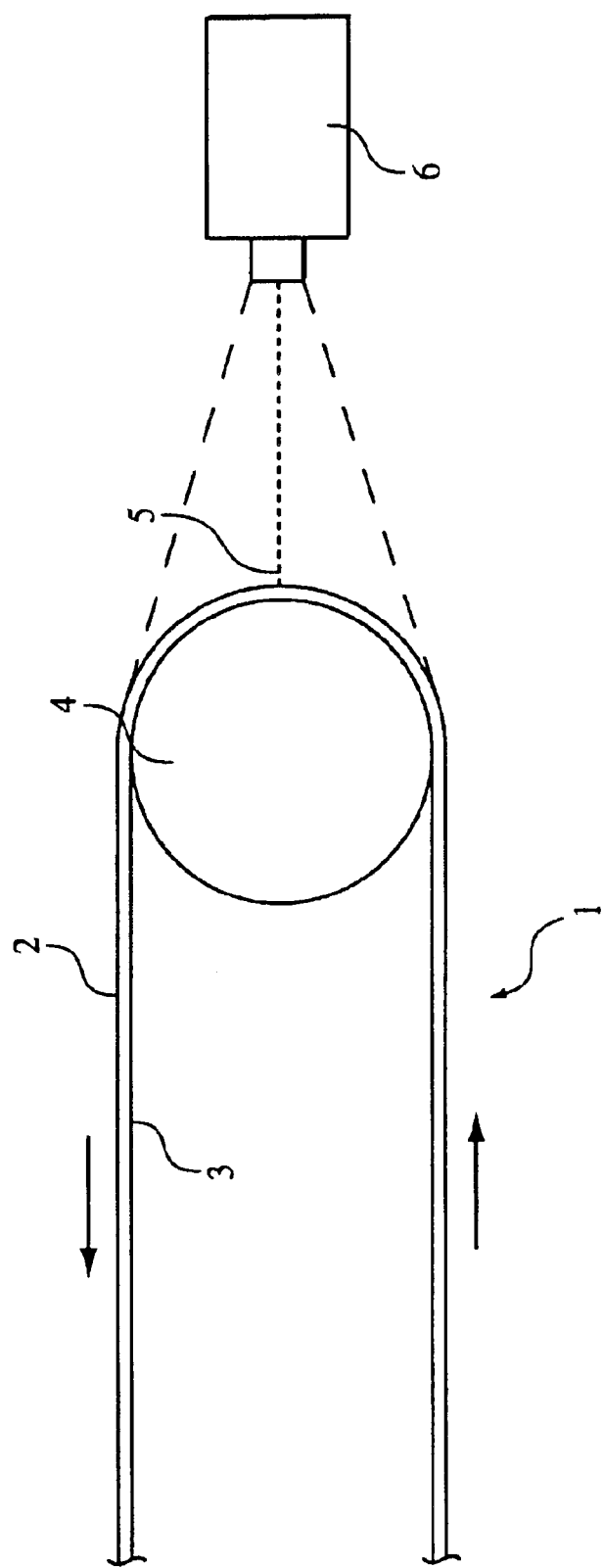
FIG. 1 is a side view of a conveyor system with an optoelectronic system installed in the vicinity of the return pulley.

The following list of reference numerals applies in connection with said figures:
1=conveyor belt
2=carrying side
3=backing side
4=return pulley
5=culmination point
6=optoelectronic system
7=damage
8=process computer
9=scanning unit
10=drive control.

DETAILED DESCRIPTION OF THE INVENTION

FIG. 1 shows a conveyor system, whereby the conveyor belt 1, which is made of elastomeric material, i.e. rubber or a plastic similar to rubber, comprises a carrying side 2 and a backing side 3. In the direction of transport (direction indicated by the arrow), the conveyor belt is reversed on the return pulley 4, with the culmination point 5 of the carrying side 3.

An optoelectronic system 6 in the form of a digital or area camera is now aimed at the culmination point 5 (dotted line) and substantially covers in this connection the entire range of the reverse pulley. Since the conveyor belt is both free of transported material and aligned in a plane manner in said range, the carrying side can be observed there for damage by the optoelectronic system in a particularly good manner.

Figure 2:
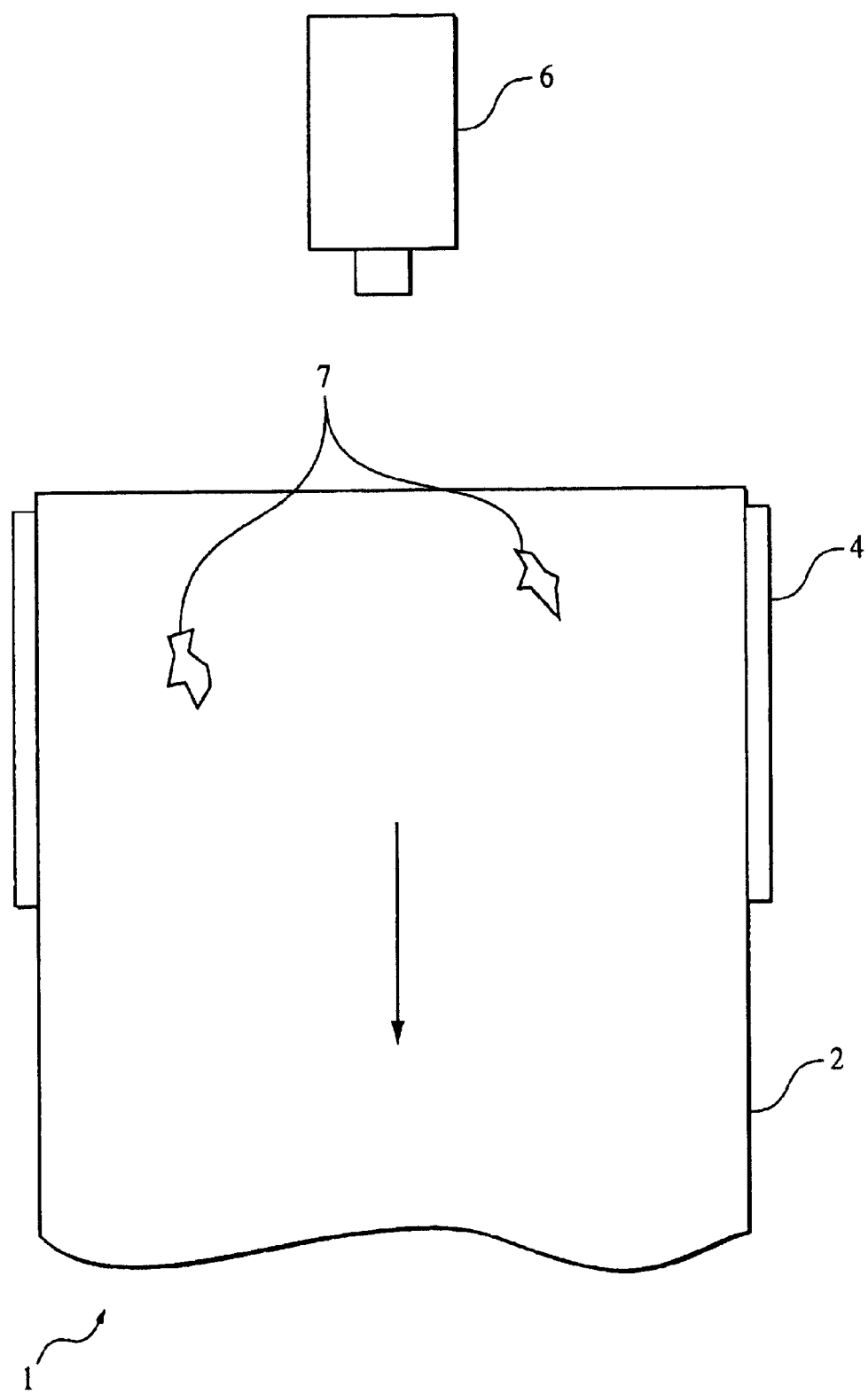
FIG. 2 is a top view of a conveyor system, showing damage to the carrying side.

FIG. 2 shows the conveyor system in the area of the return pulley 4 and the optoelectronic system 6. The carrying side 2 has a damage 7, for example in the form of deepenings. The optoelectronic system recognizes such damage and issues a report accordingly.

The optoelectronic system 6 is advantageously connected with a device for blowing it clear. The optics is kept clean in this way.

Figure 3:
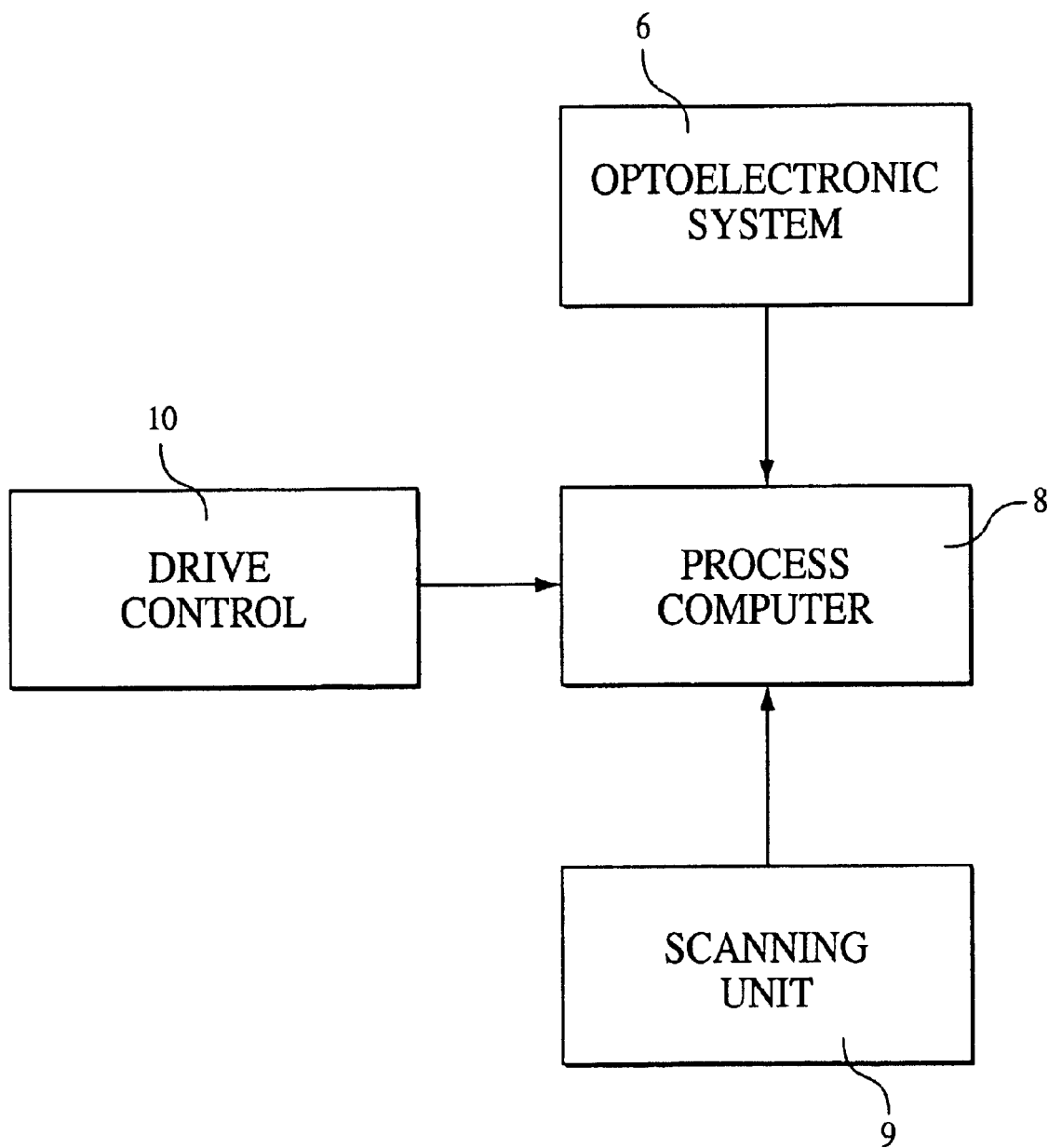
FIG. 3 shows the coupling of the optoelectronic system with a process computer, a scanning unit and a drive control.

FIG. 3 shows the cooperation between the optoelectronic system 6, the process computer 8, the scanning unit 9 and the drive control 10, notably under the following aspects:

The optoelectronic system 6 reports the damage 7 (FIG. 2), which is recorded and evaluated by means of the process computer 8 in particular in conjunction with a sound and/or visual warning alert.

By means of the coupling of the scanning unit 9 with the optoelectronic system 6 and via the process computer 8 as the interface, the damage 7 (FIG. 2) can be localized in a targeted manner, which is advantageous in connection with conveyor installations operating over long distances.

The scanning unit 9 itself, which is preferably installed in the vicinity of the drive pulley, the return pulley or the reverse pulley, detects, for example permanent magnets vulcanized into the conveyor belt 1 (FIGS. 1, 2). This technology has already been addressed in detail above in the description.

By means of the coupling of the drive unit 10 with the optoelectronic system 6, again via the process computer 8 acting as the interface, the conveyor system can be automatically shut down especially when serious damage is detected.

The drive unit 10 is a rotating part of the conveyor system, preferably the drive pulley or the return pulley (FIGS. 1, 2).

What is claimed is:

1. A device for monitoring a conveyor installation comprising a conveyor belt (1) made of elastomeric material, with a carrying side (2) for the transported material and a backing side (3), whereby the conveyor belt comprises embedded reinforcements;

other components of the installation, include a drive pulley, a return pulley (4), a reverse pulley, supporting rollers, mounting structures, and a feed chute; wherein the device is provided with an optoelectronic system (6) in an area where no material transport takes place, which observes the carrying side (2) and optically detects a damage (7) of the conveyor belt (1) and reports it, in conjunction with an automatic shutdown of the conveyor system.

2. The device according to claim 1, wherein the optoelectronic system (6) is installed in the vicinity of the drive pulley, the return pulley (4) or the reverse pulley.

3. The device according to claim 2, wherein the optoelectronic system (6) is aimed at the culmination point (5) of the carrying side (2) of the conveyor belt (1) as the latter is passing by the drive pulley, the return pulley (4) or the reverse pulley.

4. The device according to claim 1,
wherein the optoelectronic system (6) comprises at least one digital line or area camera, in particular in the form of a digital line camera.

5. The device according to claim 1,
wherein the optoelectronic system (6) triggers a sound or visual warning alert upon detection of a damage (7) of the conveyor belt (1).

6. The device according to claim 1, additionally comprising
at least one detectable element integrated in the conveyor belt (1) in, particular in the form of a plurality of elements arranged spaced from each other in the longitudinal and/or transverse directions; as well as
at least one scanning unit (9) with the help of which the damage (7) is localized without contact upon detection of the element or elements.

7. The device according to claim 6,
wherein the detectable element is completely embedded in the conveyor belt (1).

8. The device according to claim 6,
wherein the detectable element is arranged within the carrying side (2) of the conveyor belt (1).

9. The device according to claim 6,
wherein the detectable element is a transponder, a metal particle or a permanent magnet.

10. The device according to claim 6,
wherein the scanning unit is installed in the vicinity of the drive pulley, the return pulley (4) or the reverse pulley.

11. The device according to claim 1,
wherein the optoelectronic system (6) is coupled with a process computer (8).

12. The device according to claim 11,
wherein the process computer is coupled with the scanning unit (9).

13. The device according to claim 11,
wherein the process computer (8) is coupled with a drive control (10) notably for the purpose of automatic shutdown of the conveyor system.

14. The device according to claim 1,
wherein the optoelectronic system (6) is connected with a device for blowing it clear.

* * * * *